US011981251B2

(12) United States Patent
Jha et al.

(10) Patent No.: US 11,981,251 B2
(45) Date of Patent: May 14, 2024

(54) AUTONOMOUS SEARCH LIGHT SYSTEM, WINCH SYSTEM COMPRISING AN AUTONOMOUS SEARCH LIGHT SYSTEM, AND AIRCRAFT COMPRISING AN AUTONOMOUS SEARCH LIGHT SYSTEM

(71) Applicant: Goodrich Lighting Systems GmbH & Co. KG, Lippstadt (DE)

(72) Inventors: Anil Kumar Jha, Lippstadt (DE); Jens Leuschner, Moehnesee (DE); Andre Hessling-Von Heimendahl, Koblenz (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 17/740,855

(22) Filed: May 10, 2022

(65) Prior Publication Data
US 2022/0379802 A1 Dec. 1, 2022

(30) Foreign Application Priority Data
May 25, 2021 (EP) .................................... 21175640

(51) Int. Cl.
*B60Q 1/24* (2006.01)
*B64D 47/02* (2006.01)
*F21S 8/00* (2006.01)
*F21V 21/30* (2006.01)
*G01S 5/02* (2010.01)
*G11B 7/09* (2006.01)

(52) U.S. Cl.
CPC ............. *B60Q 1/245* (2013.01); *B64D 47/02* (2013.01); *F21S 8/003* (2013.01); *F21V 21/30* (2013.01); *G01S 5/02213* (2020.05); *G11B 7/0901* (2013.01); *G11B 7/0908* (2013.01)

(58) Field of Classification Search
CPC .... G11B 7/0901; G11B 7/0908; B64D 47/02; B60Q 1/245
See application file for complete search history.

(56) References Cited

U.S. PATENT DOCUMENTS

| 7,025,304 B2 * | 4/2006 | Kolliopoulos | ........... B64D 1/22 244/114 R |
| 7,046,987 B2 * | 5/2006 | Siegel | ................... H04W 64/00 342/450 |
| 7,050,786 B2 * | 5/2006 | Caci | ...................... G01C 21/20 455/456.3 |

(Continued)

FOREIGN PATENT DOCUMENTS

WO    2020044411 A1    3/2020

OTHER PUBLICATIONS

European Search Report for Application No. 21175640.8, dated Nov. 29, 2021, 8 pages.

*Primary Examiner* — Arman B Fallahkhair
(74) *Attorney, Agent, or Firm* — CANTOR COLBURN LLP

(57) ABSTRACT

An autonomous search light system for being mounted to an aircraft includes a search light for emitting an adjustable light output; an RF receiver with at least two RF antennas for receiving RF signals emitted by an RF transmitter; and a controller for determining a position of the RF transmitter in relation to the search light from the received RF signals and for controlling the search light based on the determined position of the RF transmitter.

24 Claims, 5 Drawing Sheets

(56) References Cited

U.S. PATENT DOCUMENTS

| | | | |
|---|---|---|---|
| 7,106,430 B2 | 9/2006 | Fabel | |
| 7,245,251 B2 | 7/2007 | Vogel et al. | |
| 7,270,077 B2 * | 9/2007 | Beck | A62B 33/00 |
| | | | 116/210 |
| 7,471,242 B2 * | 12/2008 | Kolavennu | G01C 21/16 |
| | | | 342/450 |
| 7,672,760 B2 * | 3/2010 | Solberg | F21S 8/003 |
| | | | 318/55 |
| 8,791,859 B2 * | 7/2014 | Larson | G01S 5/04 |
| | | | 342/442 |
| 8,996,203 B2 * | 3/2015 | Jungwirth | B64D 47/02 |
| | | | 701/1 |
| 10,023,312 B2 * | 7/2018 | Repp | B64D 1/22 |
| 10,330,769 B1 * | 6/2019 | Mayer | G01S 5/04 |
| 10,495,751 B2 * | 12/2019 | Moreira Neto | G01S 13/935 |
| 11,457,490 B2 * | 9/2022 | Katan Baf Nezhad | ........ |
| | | | H04W 76/15 |
| 2020/0172264 A1 | 6/2020 | Das et al. | |
| 2020/0240602 A1 * | 7/2020 | Huang | G06V 20/13 |

\* cited by examiner

AUTONOMOUS SEARCH LIGHT SYSTEM, WINCH SYSTEM COMPRISING AN AUTONOMOUS SEARCH LIGHT SYSTEM, AND AIRCRAFT COMPRISING AN AUTONOMOUS SEARCH LIGHT SYSTEM

CROSS-REFERENCE TO RELATED APPLICATIONS

This application claims priority to European Patent Application No. 21175640.8 filed May 25, 2021, the entire contents of which is incorporated herein by reference.

TECHNICAL FIELD

The invention relates to exterior aircraft lighting equipment, in particular to lighting equipment to be mounted to a vertical take-off and landing (VTOL) aircraft or to a rotorcraft, such as a helicopter, a multicopter or a drone. The invention relates in particular to a search light system, to a winch system comprising such search light system, to an aircraft, in particular to a VTOL aircraft or to a rotorcraft, comprising such search light system, and to a method of operating a search light system.

BACKGROUND

Aircraft are often equipped with exterior lights including search lights, which are configured for emitting an adjustable light output for enhancing the visibility of targets, such as obstacles and objects including human beings in the vicinity of the aircraft. Search lights are in particular used for illuminating targets in the course of search and rescue ("SAR") operations.

In order to enhance the visibility of a target in a dark environment, the adjustable light output of a search light is ideally directed towards the respective target. It, however, is difficult for a human operator to see and identify the target, as long as it is not illuminated. Further, it may be desired to continuously update the light output for compensating movements of the target with respect to the aircraft, which may lead to a high level of operator activity.

It therefore would be beneficial to provide an improved search light system, which facilitates the illumination of targets in the vicinity of the aircraft.

SUMMARY

Exemplary embodiments of the invention include an autonomous search light system for being mounted to an aircraft, wherein the autonomous search light system comprises: a search light for emitting an adjustable light output; an RF (RF=radio frequency) receiver with at least two antennas for receiving RF signals emitted by an RF transmitter; and a controller for determining a position of the RF transmitter in relation to the search light from the received RF signals and for controlling the search light for adjusting the adjustable light output based on the determined position of the RF transmitter.

Exemplary embodiments of the invention also include a method of operating an autonomous search light system, the autonomous search light system comprising a search light for emitting an adjustable light output and an RF receiver with at least two antennas for receiving RF signals emitted by an RF transmitter, wherein the method includes: receiving RF signals emitted by the RF transmitter; determining a position of the RF transmitter in relation to the search light from the received RF signals; and autonomously controlling the adjustable search light for adjusting the adjustable light output based on the determined position of the RF transmitter.

An autonomous search light system and a method according to exemplary embodiments of the invention allow for autonomously determining the position of a target and adjusting an adjustable light output of the autonomous search light. It may in particular allow for autonomously directing the adjustable light output towards a target. In consequence, the target does not need to be visible to the human eye for identifying the target and directing the adjustable light output towards the target. Thus, the target may be found and identified more easily and reliably. Further, relative movements between the aircraft and the target may be automatically compensated for by the autonomous search light system. This may result in a continuous illumination of the target without human intervention, even when the aircraft and/or the target are moving. In consequence, continuous illumination of the target may be reliably provided, and the visibility of the target may be enhanced.

According to a further embodiment, the controller is configured for controlling at least one of a light output direction, a light output intensity and a focus of the adjustable light output, or any combination thereof. Analogously, autonomously controlling the search light may include at least one of adjusting a light output direction of the adjustable light output; adjusting a light output intensity of the adjustable light output; and adjusting a focus of the adjustable light output, or any combination thereof. This may allow for optimizing the illumination of the target under different environmental conditions. It may in particular allow for adjusting the illumination to varying distances between the autonomous search light system and the illuminated target.

According to a further embodiment, each of the RF antennas is an angular sensitive RF antenna which allows for determining a spatial direction from which a detected RF signal is received/from which a detected RF signal originates.

According to an embodiment, each of the RF antennas includes an array of RF antenna elements, respectively. The RF antenna elements may be arranged in a one-dimensional (linear) configuration, in a two-dimensional configuration, in particular in a two-dimensional matrix-configuration, or in a three-dimensional configuration. With the array of RF antenna elements, a direction of origin of the signal, emitted by the RF transmitter, may be determined by the RF antenna in question in an effective manner.

According to a further embodiment, the controller is configured to determine a three-dimensional position of the RF transmitter by triangulation from the at least three RF signals received by at least three spatially separated antennas.

According to a further embodiment, the autonomous search light system comprises at least three spatially separated RF antennas, which are configured for receiving RF signals emitted by the RF transmitter. The three RF antennas may allow for determining the three-dimensional position of an RF transmitter from the RF signals received by the three RF antennas.

According to a further embodiment, the autonomous search light system comprises exactly two RF antennas or exactly three RF antennas, which are spatially separated from each other. As laid out above, the three-dimensional position of an RF transmitter may be determined from the signals received by exactly three RF antennas. In case additional information about the position of the RF transmitter is available, the signals provided from two RF antennas may also be sufficient for determining the three-dimensional position of an RF transmitter.

According to a further embodiment, the RF antennas are spaced apart from each other. This may allow for determining the position of the RF transmitted/target by triangulation. In particular, the RF antennas may be spaced apart from each other in a distance of at least 15 cm, the RF antennas may in particular be spaced apart from each other in a distance of at least 20 cm.

According to a further embodiment, the RF antennas may be spaced apart from each other in a distance of at most 10 m, in particular in a distance of at most 5 m.

According to a further embodiment, the RF antennas may be spaced apart from each other in a distance of between 15 cm and 5 m, in particular in a distance of between 20 cm and 1 m.

In an embodiment, the RF receiver and the RF antennas are configured for receiving RF signals in a frequency range of between 200 MHz and 500 MHz, more particularly frequencies in the range of between 350 MHz and 450 MHz. Commercially available search and rescue equipment devices, such as life vests and avalanche detecting devices, are often equipped with RF transmitters which, after being activated, emit RF signals in said frequency range. Thus, an autonomous search light system comprising an RF receiver and RF antennas, which are configured for receiving RF signals within a frequency range of between 200 MHz and 500 MHz, more particularly within a frequency range of between 350 MHz and 450 MHz, may be compatible with such commercially available life saving equipment devices. This may allow the autonomous search light system to direct the light output autonomously towards life saving equipment devices, which are present within a search area around the aircraft. In consequence, persons equipped with such life saving equipment devices may be found and rescued faster and more easily.

In an embodiment, the RF receiver and the RF antennas may be configured for receiving RF signals in a frequency range of between 1 GHz and 10 GHz, more particularly frequencies in the range of between 2 GHz and 4 GHz; and the RF transmitter may be configured for emitting RF signals in said frequency range.

In an embodiment, the autonomous search light system further comprises an RF transmitter for emitting RF signals to be received by the RF receiver. In operation, the RF transmitter may be decoupled/detached from the other components of the autonomous search light system. The RF transmitter may in particular be configured for emitting RF signals in the range of between 1 GHz and 10 GHz, more particularly frequencies in the range of between 2 GHz and 4 GHz.

The frequency range between 1 GHz and 10 GHz includes "free" frequency bands, i.e. frequency bands which may be used without specific permission and without the risk of disturbing navigation and/or communication equipment of the aircraft.

In an embodiment, the RF receiver is configured for receiving Bluetooth® signals and/or WiFi signals, and the RF transmitter may be configured for emitting Bluetooth® signals and/or WiFi signals. The Bluetooth® signals may in particular be signals according to the "Bluetooth5®" standard or higher a higher standard. The WiFi signals may in particular be signals according to the IEEE-802.11 standard.

Bluetooth® and WiFi protocols are reliable and secure wireless communication protocols, which also allow for a low power consumption of the RF transmitter and the RF receiver.

In an embodiment, the autonomous search light system may comprise at least two RF receivers and/or at least two different types of RF antennas. The autonomous search light system may in particular comprise a first RF receiver and RF antennas of a first type, configured for receiving RF signals in a first frequency band; and the autonomous search light system may comprise a second RF receiver and RF antennas of a second type, configured for receiving RF signals in a second frequency band. In such a configuration, the RF receivers and the RF antennas may be adapted to the respective frequency band.

In an embodiment, the first frequency band may include frequencies in the range of between 1 GHz and 10 GHz, more particularly frequencies in the range of between 2 GHz and 4 GHz, and the second frequency band may include frequencies in the range of between 200 MHz and 500 MHz, more particularly frequencies in the range of between 350 MHz and 450 MHz.

In an alternative embodiment, the autonomous search light system may comprise at least one broadband RF receiver and/or broadband RF antennas, which are configured for receiving RF signals over a wide range of frequencies, in particular frequencies over the range of between 200 MHz and 10 GHz. In such an embodiment, the number of RF receivers and RF antennas may be reduced, as compared to a configuration comprising multiple RF receivers and RF antennas dedicated to a specific frequency band. In consequence, the dimensions, the weight and the costs of the autonomous search light system may be reduced as well.

In an embodiment, the RF transmitter comprises an autonomous electric power source, in particular a rechargeable electric power source, such as a rechargeable electric battery. An autonomous electric power source allows for operating the RF transmitter independently, i.e. without providing an electric power supply connection, such as a cable, between the RF transmitter and the aircraft. It is also possible that the RF transmitter comprises a wireless energy harvesting module.

In an embodiment, the RF transmitter is selectively operable in a transmitting mode, in which the RF transmitter emits RF signals, and in a standby mode or sleeping mode, in which the RF transmitter does not emit RF signals. Switching the RF transmitter into the standby mode, when there is no need for determining the position of the RF transmitter, in particular when the autonomous search light system is not used, may allow for saving electric power and prolonging the operation time of the RF transmitter when it relies on the autonomous electric power source.

In an embodiment, the RF transmitter is manually switchable between the standby mode and the transmitting mode by operating a manual switch provided at the RF transmitter.

In an embodiment, the RF receiver and the RF transmitter both are RF transceivers allowing for a bi-directional communication between the RF receiver and the RF transmitter. In addition to RF signals from the RF transmitter to the RF receiver, the bi-directional communication additionally includes RF signals transmitted from the RF receiver to the RF transmitter. Such a configuration may allow for switching the RF transmitter from the standby mode into the transmitting mode by transmitting a "wake-up" RF signal from the RF receiver to the RF transmitter. This may allow for activating the RF transmitter, when the autonomous search light system is activated.

In an embodiment, the RF transmitter is configured for switching back into the energy saving standby mode, when it does not receive a (further) wake-up signal for more than a predetermined amount of time. Alternatively or additionally, the RF transmitter may be configured to switch back into the energy saving standby mode upon receiving a shutdown signal from the RF receiver. By switching the RF transmitter into the standby mode, more electric energy may be saved. As a result, the operation time of the RF transmitter and the electric power source may be extended even further.

In an embodiment, the autonomous search light system further comprises a manual input device, which allows for manually controlling the search light by providing manual input via the manual input device. The manual input device may include a control stick. The manual input device may be located in the cockpit or close to a winch of the aircraft.

In an embodiment, operating an autonomous search light system may include deactivating the autonomous control of the search light and controlling the search light manually by operating the manual input device. Controlling the search light manually may be beneficial under special operational circumstances, in which an autonomous control of the light output does not result in the desired illumination of the target(s).

In an embodiment, the search light comprises at least one light source. The at least one light source may be or may include an LED. The search light may further comprise at least one optical element for forming the light output emitted by the at least one light source. The optical element may be a lens and/or a reflector. If the search light comprises a plurality of light sources, an individual optical element may be assigned to each of the plurality light sources or to respective groups of light sources. The search light may in particular comprise at least one optical element which is assigned to a plurality of light sources, in particular to all light sources of the search light.

In an embodiment, the autonomous search light system is configured for mechanically adjusting the adjustable light output, for example by moving at least one of the search light as a whole and/or the at least one light source and/or the at least one optical element by a mechanical actuator, such as a motor. Mechanically adjusting the adjustable light output may allow for adjusting the adjustable light output over a wide range of different light outputs.

In an embodiment, the autonomous search light system may be configured for adjusting the adjustable light output without mechanical movement, for example by selectively activating and deactivating and/or selectively dimming different light sources of a plurality of light sources of the search light. Adjusting the adjustable light output without mechanical movement may reduce the weight of the autonomous search light system and may enhance the operational reliability of the autonomous search light system, as the risk of mechanical failure may by reduced or even eliminated. It is also possible that the autonomous search light system is configured for adjusting the adjustable light output via a combination of mechanical actuation on the one hand and selective activating/deactivating/dimming of light sources on the other hand.

Exemplary embodiments of the invention also include a winch system configured for being mounted to an aircraft, wherein the winch system comprises an autonomous search light system according to an exemplary embodiment of the invention. A winch system including an autonomous search light system according to an exemplary embodiment of the invention may allow for autonomously illuminating a load, which is attached to or which is going to be attached to the winch system for being lifted or lowered by the winch system. In consequence, operation of the winch system may be enhanced and facilitated, in particular in a dark environment. In consequence, pilots of the aircraft and operators of the winch system may concentrate on operating the aircraft and the winch system, as they do not need to adjust the illumination of the load depending on its current position. As a result, the operation of the aircraft and the winch may be facilitated and the safety may be enhanced.

In an embodiment, the winch system comprises a stationary winch portion, which is configured to be attached to the aircraft, and a movable winch portion, such as rope or cable, which is movable with respect to the stationary winch portion. A fastening device, such as a hook, may be provided at a movable end/free end of the movable winch portion, in order to allow for attaching a load to the movable end of the movable winch portion. The RF transmitter of the autonomous search light system may be located at the movable winch portion, in particular at the movable end/free end thereof, in order to allow for determining the position of the movable winch portion and directing and/or focusing the adjustable light output onto the movable winch portion. Such a configuration may allow for enhancing the illumination of a load attached to the movable winch portion, in particular when the load is moved by operating the winch.

In an embodiment, the RF receiver is attached to the stationary winch portion or to a portion of the exterior of the fuselage of the aircraft. Such a configuration may allow for a good transmission of RF signals between the RF transmitter and the RF receiver, as the RF signals are not shielded by the fuselage of the aircraft.

In an alternative embodiment, the RF receiver is arranged inside the aircraft. In such a configuration, the RF receiver is protected from adverse environmental influences, such as water, moisture and dirt, by the fuselage of the aircraft.

In an embodiment, the winch system comprises a rotatable member, in particular a drum. The movable winch portion, for example a rope or a cable, which may comprise steel and/or a synthetic material and which extends between the rotatable member and the movable end/free end of the movable winch portion, may be wound on the rotatable member, so that the movable end of the movable winch portion may be moved by rotating the rotatable member.

In an embodiment, the winch system further comprises a rotational detector for detecting a rotational position of the rotatable member.

In such an embodiment, the controller may be configured for determining the position of the RF transmitter, mounted to the movable winch portion, from a combination of the received RF signals and the rotational position of the rotatable member, as detected by the rotational detector. The rotational position of the rotatable member, detected by the rotational detector, may in particular replace one of the RF signals received by the RF antennas.

For determining the three-dimensional position of the RF transmitter by triangulation, generally RF signals received by at least three spatially separated RF antennas are used. The rotational position of the rotatable member, as detected by the rotational detector, however, includes information about the distance between the RF transmitter attached to the movable winch portion and the stationary winch portion. This information may substitute the information provided by the signal received by one of the three RF antennas, so that that the RF signals received by two spatially separated RF antennas are sufficient for determining the three-dimensional position of the RF transmitter. In consequence, the costs for providing the RF receiver(s) and the RF antennas may be reduced.

Exemplary embodiments of the invention also include an aircraft which is equipped with an autonomous search light system according to exemplary embodiments of the invention and/or with a winch system according to exemplary embodiments of the invention.

In an embodiment, the aircraft is a VTOL aircraft or a rotorcraft, such as a helicopter, a multicopter or a drone. VTOL aircraft and rotorcraft are well suited for being used in search and rescue operations, in particular for rescuing endangered persons and persons having an accident, by employing a winch attached to the aircraft.

BRIEF DESCRIPTION OF THE DRAWINGS

Further exemplary embodiments of the invention will be described in the following with respect to the accompanying drawings, wherein.

DETAILED DESCRIPTION

Figure 1:
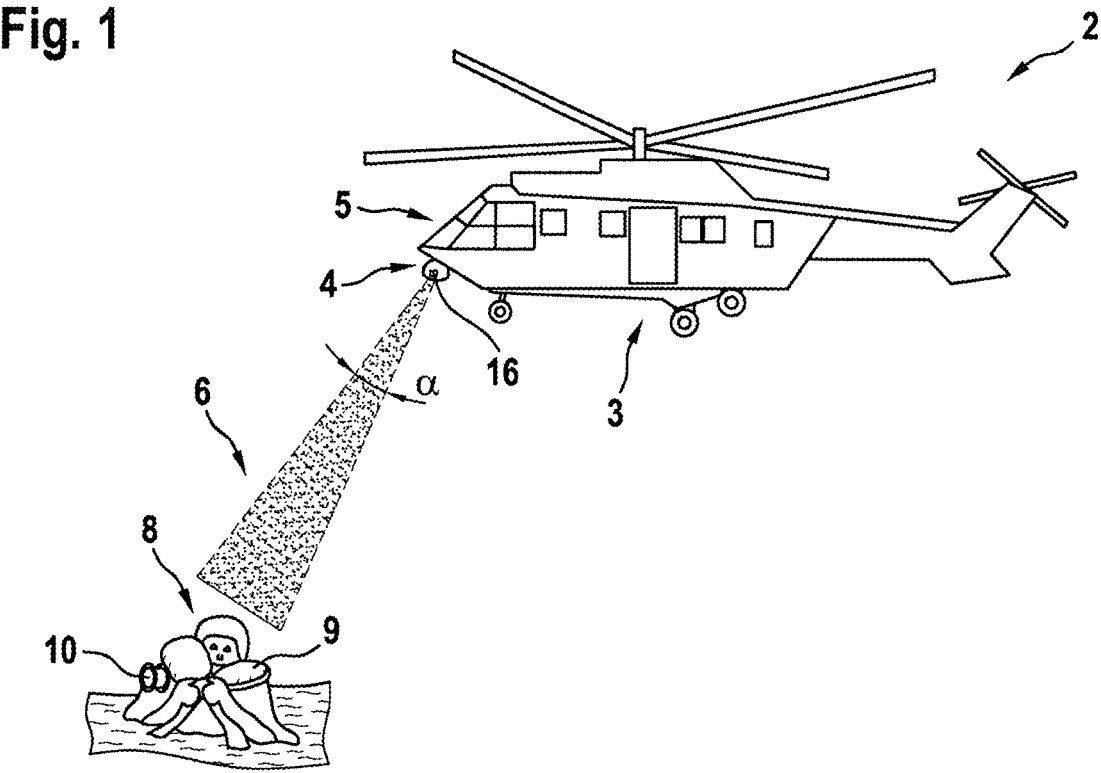
FIG. 1 shows a schematic side view of an aircraft equipped with an autonomous search light system according to an exemplary embodiment of the invention.

FIG. 1 shows a schematic side view of an aircraft 2, in particular of a helicopter, which is equipped with an autonomous search light system 4 according to an exemplary embodiment of the invention. In the embodiment depicted in FIG. 1, the autonomous search light system 4 is mounted to the fuselage 3 of the aircraft 2. In particular, the autonomous search light system 4 is mounted to a front portion of the belly below the cockpit 5 of the aircraft 2. As mentioned before, autonomous search light systems 4 according to exemplary embodiments of the invention may be mounted to other kind of aircraft 2, including VTOL aircraft, multicopters or drones, as well.

The autonomous search light system 4 is configured for emitting an adjustable light output 6 for illuminating a target 8 below the aircraft 2, for example during a search and rescue operation, as it is depicted in FIG. 1. The adjustable light output 6 may be a search light beam having an opening angle α in the range of between 5° and 10°, in particular an opening angle α of between 6° and 8°, more in particular an opening angle α of about 7°.

In the configuration depicted in FIG. 1, the target 8 is a person wearing a life jacket 9, who is to be rescued out of water. This kind of target 8 is only an example, and an autonomous search light system 4 according to an exemplary embodiment of the invention may be employed for illuminating other kinds of targets 8 as well.

In the example shown in FIG. 1, an RF transmitter 10, emitting RF signals, is attached to the life jacket 9. The RF signals, emitted by the RF transmitter 10, are received by an RF receiver 16, which is part of the autonomous search light system 4. The RF signals received by the RF receiver 16 allow the autonomous search light system 4 to determine the position of the target 8 with respect to the autonomous search light system 4 and to control the light output 6 for illuminating the target 8 without human intervention.

Figure 2:
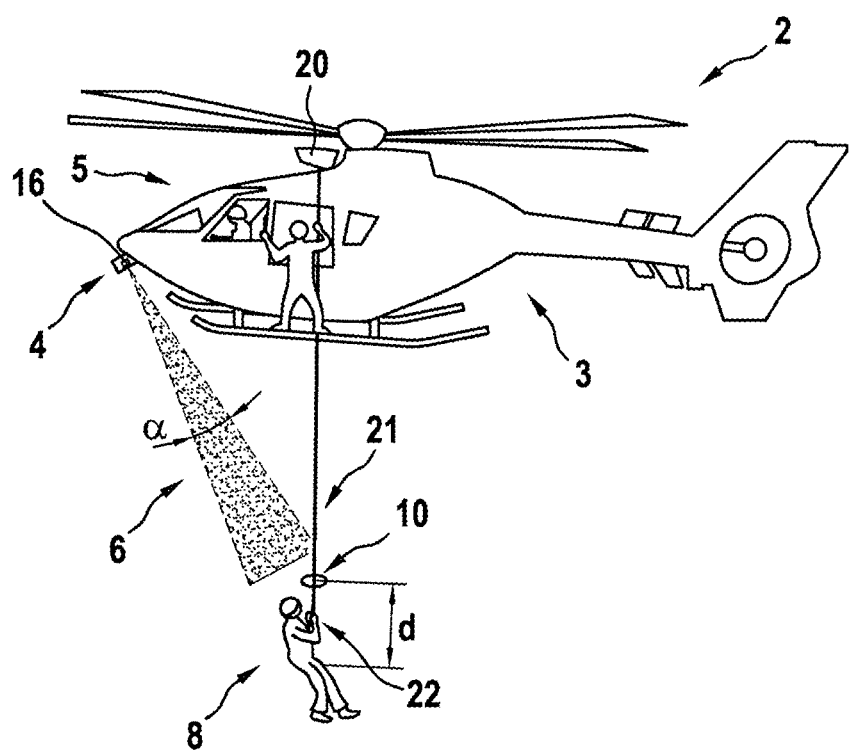
FIG. 2 shows a schematic side view of another aircraft equipped with an autonomous search light system according to an exemplary embodiment of the invention.

FIG. 2 shows a schematic side view of an aircraft 2, in particular a helicopter, which is also equipped with an autonomous search light system 4 according to an exemplary embodiment of the invention.

In the exemplary embodiment depicted in FIG. 2, the aircraft 2 is equipped with a winch system 20 including a movable winch portion 21, in particular a rope or cable. A hook 22, which is attached to a movable end/a free end of the movable winch portion 21, may be lowered from and lifted to the aircraft 2 by operating the winch system 20. An RF transmitter 10 is provided at the free end of the movable winch portion 21 close to the hook 22. The RF transmitter 10 may in particular be attached to or formed integrally with the hook 22.

Similar to the embodiment depicted in FIG. 1, an RF receiver 16, which is part of the autonomous search light system 4, is configured for receiving RF signals emitted by the RF transmitter 10, in order to allow the autonomous search light system 4 to determine the current position of the RF transmitter 10 with respect to the aircraft 2 from the received RF signals. The autonomous search light system 4 is configured to control the light output 6, emitted by the autonomous search light system 4, for illuminating a target 8, e.g. a person, which is attached to the hook 22 at the movable end of the movable winch portion 21.

The autonomous search light system 4 may in particular be configured such that the light output 6 automatically follows any movement of the target 8, relative to the aircraft 2, for continuously illuminating the target 8 without human intervention.

Figure 3A:
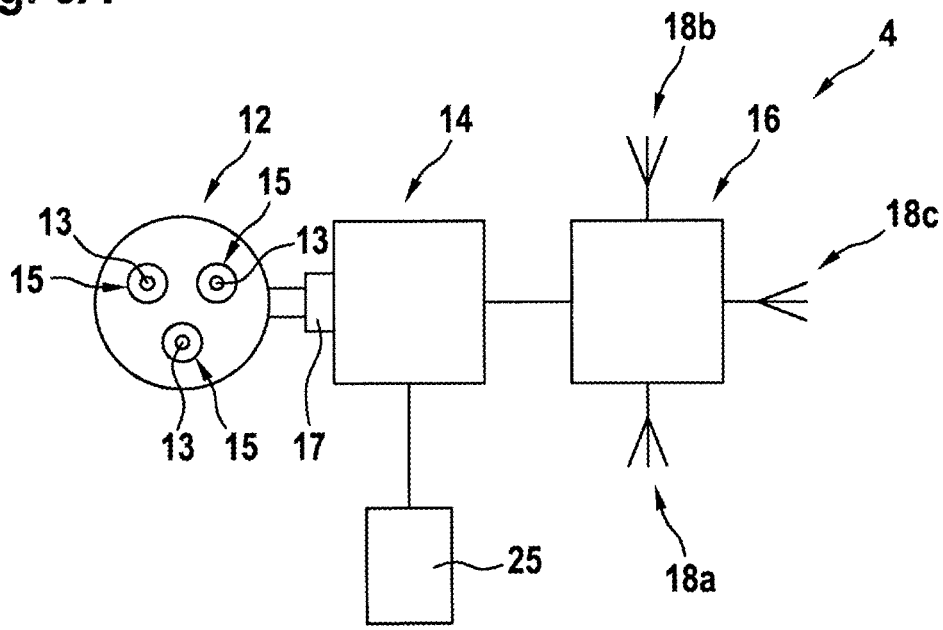
FIG. 3A shows a schematic block diagram of an autonomous search light system according to an exemplary embodiment of the invention.

FIG. 3A depicts a schematic block diagram of an autonomous search light system 4 according to an exemplary embodiment of the invention.

The autonomous search light system 4 comprises a search light 12 with at least one light source 13 and at least one optical element 15. In the exemplary embodiment depicted in FIG. 3A, three light sources 13 and three optical elements 15 are shown.

The at least one light source 13 may be or may include an LED. The optical element 15 may include a lens and/or a reflector. The search light 12 is configured for emitting the adjustable light output 6. The search light 12 may allow for adjusting the direction and/or the intensity and/or the focus and/or other parameters of the adjustable light output 6.

The autonomous search light system 4 may be configured for mechanically adjusting the adjustable light output 6, for example by moving, in particular tilting, the search light 12 and/or the at least one light source 13 and/or the at least one optical element 15 using one or more mechanical actuator(s) 17, such as one or more electric motor(s). Alternatively or additionally, the autonomous search light system 4 may be configured for adjusting the adjustable light output 6 by selectively activating and deactivating and/or dimming individual light sources 13 selected from the plurality of light sources 13 of the search light 12. The selective control of the individual light sources 13 may also be combined with the mechanical movement of the search light 12 and/or its components.

The autonomous search light system 4 further comprises an RF receiver 16 with at least two RF antennas 18a, 18b, 18c. The RF receiver 16 may in particular comprise three RF antennas 18a, 18b, 18c, as depicted in FIG. 3A. The at least two RF antennas 18a, 18b, 18c are spatially separated from each other and are configured for receiving RF signals emitted by at least one RF transmitter 10.

Each of the RF antennas 18a, 18b, 18c is an angular sensitive RF antenna 18a, 18b, 18c, which allows for determining a spatial direction from which a detected RF signal is received. Each of the RF antennas 18a, 18b, 18c may in particular include an array of RF antenna elements 19a-19d, which are arranged in a one-dimensional (linear), two-dimensional (matrix) or three-dimensional configuration.

Figure 3B:
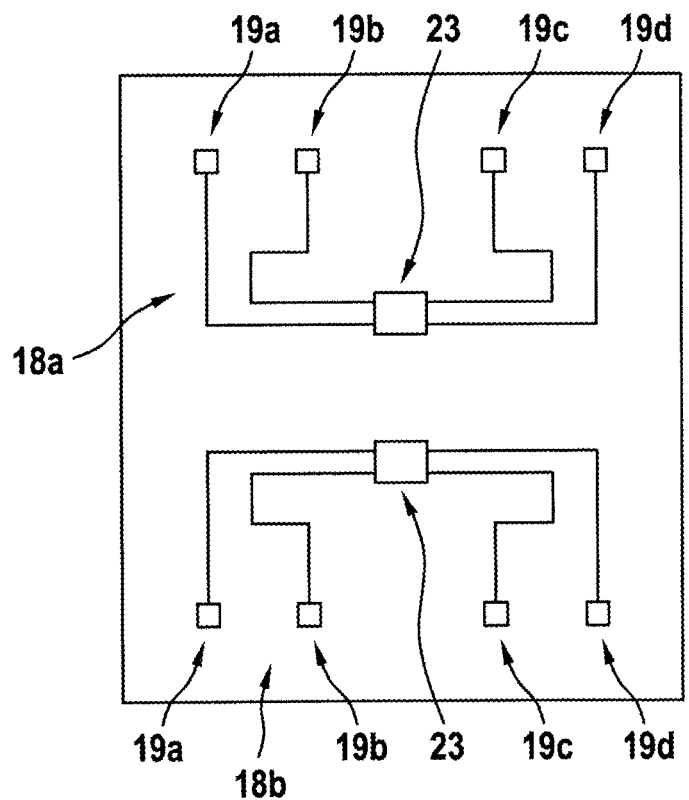
FIG. 3B schematically illustrates two RF antennas, as may be used in an autonomous search light system according to an exemplary embodiment of invention.

Exemplary embodiments of two RF antennas 18a, 18b are shown in FIG. 3B. Each RF antenna 18a, 18b comprises four antenna elements 19a-19d, which are arranged in a one-dimensional (linear) configuration on a printed circuit board (PCB) in the exemplary configuration of FIG. 3B. The antenna elements 19a-19d of each RF antenna 18a, 18b are coupled to a common locator 23, which is configured for combining the signals provided by the respective associated antenna elements 19a-19d and for providing a combined antenna signal to the RF receiver 16.

The linear configuration of the four antenna elements 19a-19d may have an extension of between 1 cm and 10 cm, in particular of between 3 cm and 5 cm. This linear extension is the horizontal spacing between the antenna elements 19a and 19d in the viewing direction of FIG. 3B. The two RF antennas 18a, 18b may be spaced apart from each other at a distance of between 20 cm and 1 m, in particular at a distance of between 20 cm and 30 cm. This spacing is the vertical spacing between the two lines configurations of the antenna elements 19a-19d in the viewing direction of FIG. 3B.

The autonomous search light system 4 also comprises a controller 14. The controller 14 is configured for receiving an input from the RF receiver 16, for determining the position of the RF transmitter 10, emitting the signals received by the RF receiver 16, in relation to the autonomous search light system 4 from the received RF signals, and for controlling the search light 12 based on the determined position of the RF transmitter 10.

Optionally, the autonomous search light system 4 may additionally comprise a manual input device 25, in particular a manual input device 25 comprising a control stick, in order to provide an option for controlling the autonomous search light system 4 manually.

The RF receiver 16 may be configured for receiving RF signals in a frequency range of between 200 MHz and 500 MHz, more particularly frequencies in the range of between 350 MHz and 450 MHz. Commercially available life saving equipment devices 9, such as life vests and avalanche detecting devices, are often equipped with RF transmitters 10 which, after being activated, emit RF signals in said frequency range. Thus, an autonomous search light system 4 comprising an RF receiver 16 and antennas 18a, 18b, 18c, which are configured for receiving RF signals within this frequency range, are compatible with such commercially available life saving equipment devices 9. This allows the autonomous search light system 4 to autonomously direct the light output 6 towards life saving equipment devices 9, which are present within a search area around the aircraft 2. In consequence, a persons equipped with such a life saving equipment device 9 may be found and rescued faster and more easily.

If multiple RF signals, which are emitted by different RF transmitters 10, are detected, the positions of the detected RF transmitters 10 may be displayed on a display within the aircraft 2, for example a display provided within the cockpit of the aircraft 2 or at the winch system 20, on order to allow a member of the aircraft crew to select the RF transmitter 10 to which the light output 6 of the autonomous search light system 4 shall be directed. Alternatively, the light output 6 may be directed autonomously to the closest one of the detected RF transmitters 10.

Additionally or alternatively, the RF receiver 16 and the RF antennas 18a, 18b, 18c may be configured for receiving RF signals in the frequency range of between 1 GHz and 10 GHz, more particularly frequencies in the range of between 2 GHz and 4 GHz; and the RF transmitter 10 may be configured for emitting RF signals in the same frequency range. The frequency range between 1 GHz and 10 GHz includes "free" frequency bands, i.e. frequency bands which may be used without special permission and without the risk of disturbing navigation and/or communication equipment of the aircraft 2.

The RF transmitter 10 and the RF receiver 16 may be configured for communicating using a WiFi protocol and/or a Bluetooth® protocol, in particular a protocol according to the "Bluetooth5®" standard or a higher standard. These protocols may provide reliable and secure wireless communication and may allow for a low power consumption of the RF transmitter 10 and the RF receiver 16.

The autonomous search light system 4 may comprise at least two different RF receivers 16 and/or at least two types of RF antennas 18a, 18b, 18c. A first RF receiver 16 and RF antennas 18a, 18b, 18c of a first type may be configured for receiving RF signals in a first frequency band; a second RF receiver 16 and RF antennas 18a, 18b, 18c of a second type may be configured for receiving RF signals in a second frequency band, respectively.

The first frequency band may include frequencies in the range of between 1 GHz and 10 GHz, more particularly frequencies in the range of between 2 GHz and 4 GHz, and the second frequency band may include frequencies in the range of between 200 MHz and 500 MHz, more particularly frequencies in the range of between 350 MHz and 450 MHz.

In an alternative embodiment, the autonomous search light system 4 may comprise a broadband RF receiver 16 and/or broadband RF antennas 18a, 18b, 18c, which are configured for receiving RF signals over a wide range of frequencies, in particular frequencies in a range including the range of between 200 MHz and 10 GHz.

Figure 4:
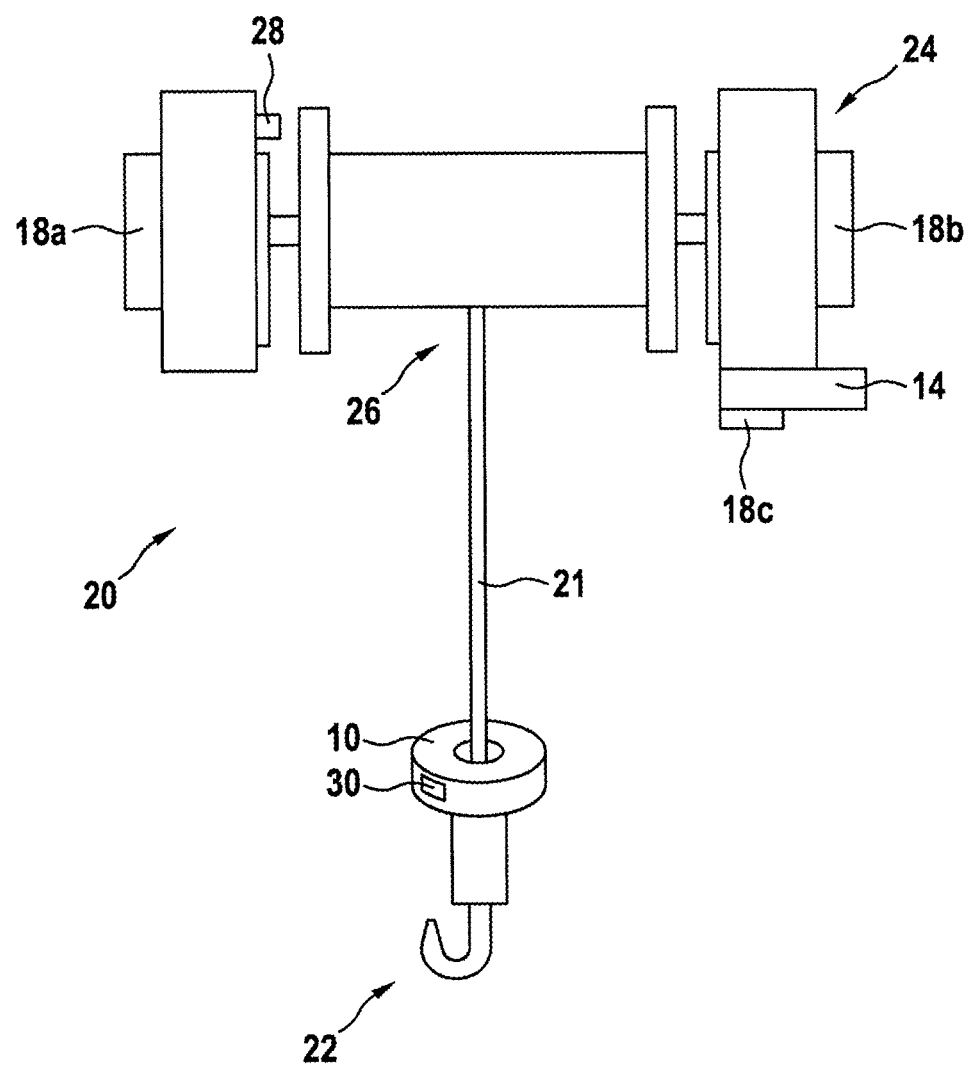
FIG. 4 shows a schematic illustration of a winch system having an autonomous search light system in accordance with an exemplary embodiment of the invention.

FIG. 4 schematically depicts a winch system 20 which is combined with an autonomous search light system 4 in accordance with an exemplary embodiment of the invention.

The winch system 20 comprises a stationary winch portion 24, which is configured to be attached to an aircraft 2 (cf. FIG. 2), and a rotatable member 26, for example a drum, which is rotatable with respect to the stationary winch portion 24. A movable winch portion 21, such as a rope or a cable, is wound around the rotatable member 26. A hook 22, which is attached to a free end of the movable winch portion 21, may be lowered and lifted by rotating the rotatable member 26. An RF transmitter 10 is provided at the free end of the movable winch portion 21 close to the hook 22.

Three antennas 18a, 18b, 18c are provided at the stationary winch portion 24. In the embodiment depicted in FIG. 4, two antennas 18a, 18b are arranged at opposite ends of the rotatable member 26 along its axial direction. The third antenna 18c is provided at the controller 14 of the autonomous search light system 4.

In alternative configurations, which are not explicitly shown in the figures, the antennas 18a, 18b, 18c may be provided at the same end of the rotatable member 26, or at another position at the stationary winch portion 24. The antennas 18a, 18b, 18c also may be located at or within the fuselage 3 of the aircraft 2.

The RF transmitter 10 comprises an electric power source 30, in particular a rechargeable electric power source 30, such as a rechargeable electric battery, in order to avoid the need for providing an electric connection between the RF transmitter 10 and the aircraft 2. The electric power source 30 may have an operation time of at least 2000 hours, in particular an operation time of at least 4000 hours, further in particular an operation time of at least 5500 hours.

In order to save energy for prolonging the operation time of the electric power source 30, the RF transmitter 10 may be selectively operable in a transmitting mode, in which the RF transmitter 10 emits RF signals, and in a power saving standby mode or sleep mode, in which the RF transmitter 10 does not emit RF signals.

In order to allow for selectively switching the RF transmitter 10 between the transmitting mode and the standby mode, the RF receiver 16 and the RF transmitter 10 both may be implemented as RF transceivers 10, 16. Both the RF receiver 16 and the RF transmitter 10 may be configured for receiving RF signals and for emitting RF signals, in order to allow for a bi-directional communication between the RF receiver 16 and the RF transmitter 10.

In such a configuration, the RF transmitter 10 still receives RF signals when operated in the standby mode, and the RF transmitter 10 may be switched from the standby mode into the transmitting mode by sending a wake-up signal from the RF receiver 16 to the RF transmitter 10.

The RF transmitter 10 may switch back into the energy saving standby mode if it does not receive a wake-up signal for more than a predetermined amount of time. Alternatively or additionally, the RF transmitter 10 may switch back into the energy saving standby mode upon receiving a shutdown or standby signal from the RF receiver 16.

Figure 5:
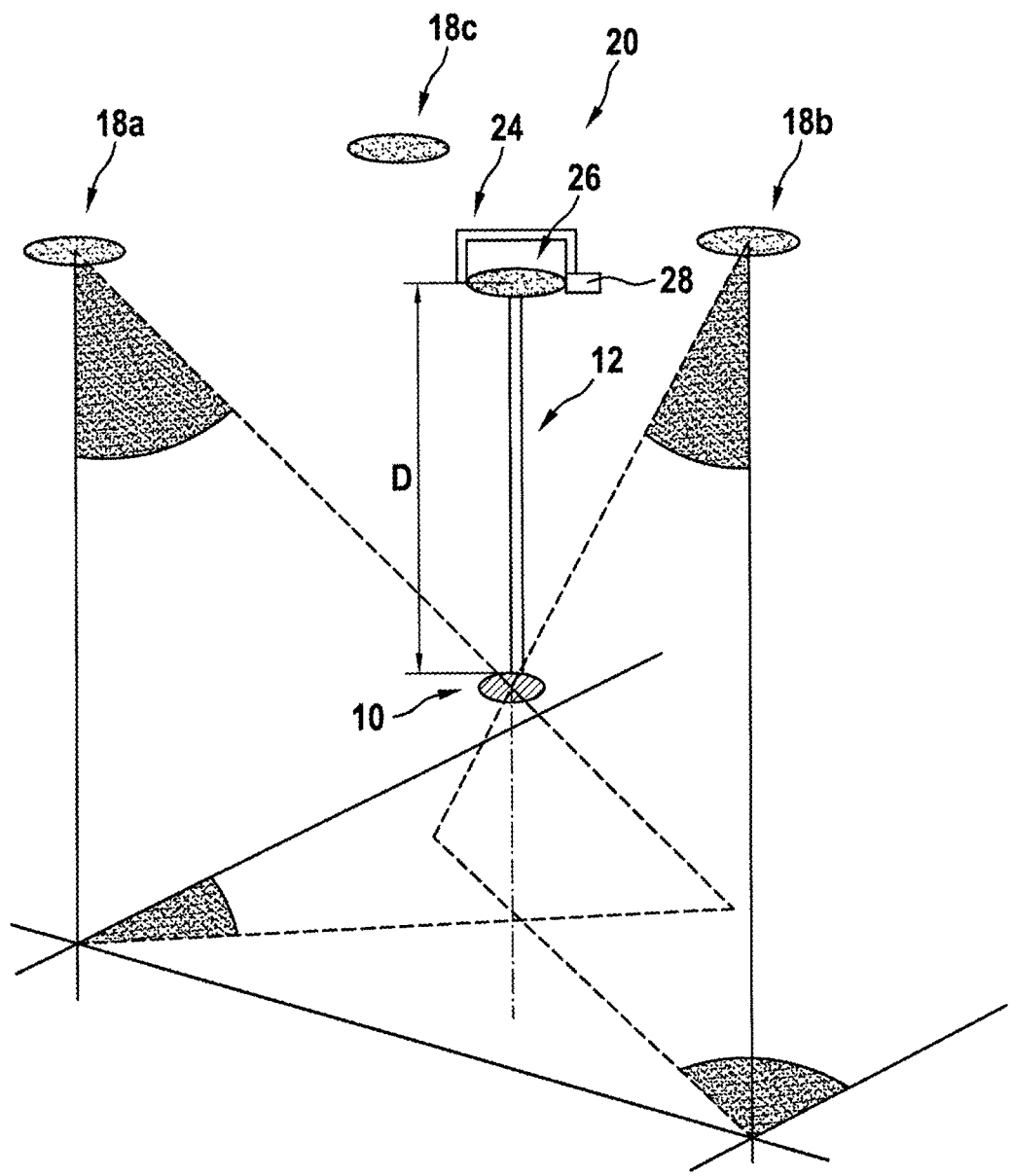
FIG. 5 schematically illustrates the determination of the position of an RF transmitter by triangulation in accordance with an exemplary embodiment of the invention.

The position of the RF transmitter 10 with respect to the RF antennas 18a, 18b, 18c may be determined from the RF signals, received by the RF antennas 18a, 18b, 18c, by triangulation, as it is schematically illustrated in FIG. 5.

Generally, RF signals received by at least three spatially separated RF antennas 18a, 18b, 18c may be used for determining the three-dimensional position of the RF transmitter 10.

A relatively small distance between the RF antennas 18a, 18b, 18c in the centimeter range, for example a distance of at least 20 cm, in particular a distance in the range of between 20 cm and 100 cm, may be sufficient for determining the position of the RF transmitter 10 with respect to the RF antennas 18a, 18b, 18c from the RF signals, received by the RF antennas 18a, 18b, 18c, with sufficient accuracy.

Increasing the distance between the RF antennas 18a, 18b, 18c may increase the accuracy of the determined position, if necessary. In the given aircraft environment, the RF antennas may be spaced at a maximum distance of 10 m, in particular at a maximum distance of 5 m.

In case the RF transmitter 10 is attached to the movable winch portion 21 of the winch system 20, as it is depicted in FIGS. 2 and 4, the RF signals received by two RF antennas 18a, 18b, 18c may be sufficient for determining the three-dimensional position of the RF transmitter 10 if the distance D between the RF transmitter 10 and the stationary winch portion 24 of the winch system 20 is known as an additional parameter.

The distance D between the RF transmitter 10 and the free end of the stationary winch portion 24 of the winch system 20 may be determined by an appropriate detector 28, for example by a rotational detector 28, which is configured for determining the rotational position of the rotatable member 26 with respect to the stationary winch portion 24.

If the distance D between the RF transmitter 10 and the stationary winch portion 24 is not known, in particular in a configuration as it is depicted in FIG. 1, in which the RF transmitter 10 is not attached to a movable winch portion 21, three RF antennas 18a, 18b, 18c may be used for determining the three-dimensional position of the RF transmitter 10 with respect to the autonomous search light system 4 from the RF signals, received by three RF antennas 18a, 18b, 18c, by triangulation.

Figure 6:
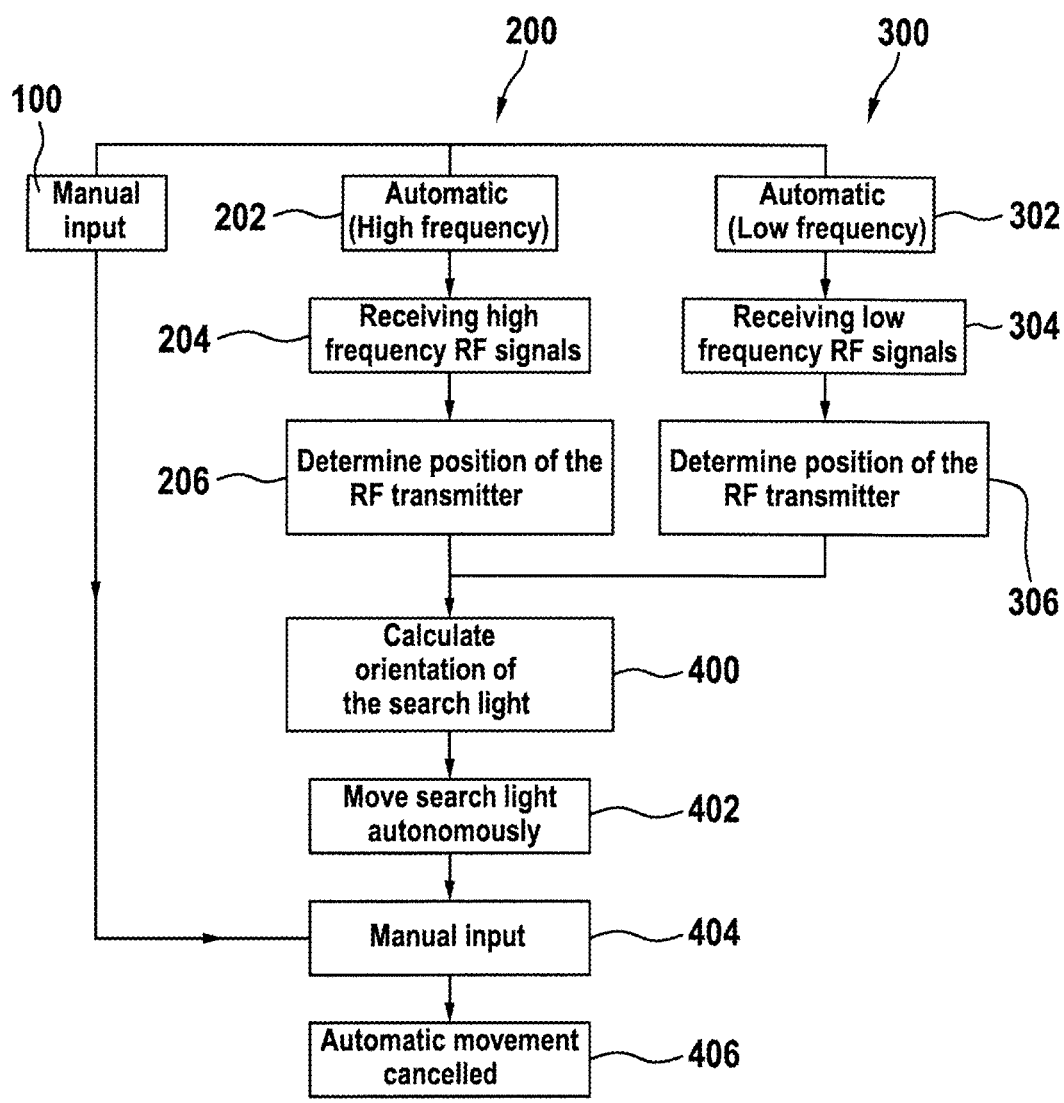
FIG. 6 shows a schematic flow diagram illustrating three different possible operation modes of an autonomous search light system according to an exemplary embodiment of the invention.

FIG. 6 shows a schematic flow diagram, illustrating different possible operation modes in which an autonomous search light system 4 according to an exemplary embodiment of the invention may be operated.

A first operation mode 100 is a conventional manual operation mode, in which the adjustable light output 6 of the autonomous search light system 4 is controlled manually via an appropriate manual input device 25 (see FIG. 3A), for example a control stick, which may be provided within the cockpit of the aircraft 2 or at the winch system 20.

The second and third operation modes 200, 300 are autonomous operation modes, in which the adjustable light output 6 of the autonomous search light system 4 is controlled autonomously, i.e. without human intervention.

When the autonomous search light system 4 is operated in the second operation mode 200, a RF transmitter 10 is activated in step 202, either manually, i.e. by means of a mechanical switch provided at the RF transmitter 10, or by transmitting a wake-up signal from the RF receiver 16 to the RF transmitter 10, as it has been described before.

When operated in the second mode 200, the RF transmitter 10 emits RF signals in a first frequency band, in particular in a first frequency band comprising frequencies in the range of between 1 GHz and 10 GHz, more particularly frequencies in the range of between 2 GHz and 4 GHz MHz, and the RF receiver 16 and the RF antennas 18a, 18b, 18c are receiving the RF signals emitted by the RF transmitter 10 (step 204).

In a next step 206, the position of the RF transmitter 10 with respect to the autonomous search light system 4 is determined from the RF signals, received by the RF antennas 18a, 18b, 18c and the RF receiver 16.

In order to determine the three-dimensional position of the RF transmitter 10, at least three pieces of information, for example RF signals received by at least three different spatially separated RF antennas 18a, 18b, 18c, are used.

In case the RF transmitter 10 is attached to a free end of a movable winch portion 21 of a winch system 20, as depicted in FIGS. 2 and 4, the distance D between the RF transmitter 10 and the stationary winch portion 24 of the winch system 20 may be determined from the output of a detector 28, provided at the winch system 20. The distance D between the RF transmitter 10 and the stationary winch portion 24 of the winch system 20 may replace the information included in one of the RF signals. Thus, in case the distance D between the RF transmitter 10 and the stationary winch portion 24 of the winch system 20 is known, RF signals received by two spatially separated RF antennas 18a, 18b, 18c may be used for determining the three-dimensional position of the RF transmitter 10 with respect to the autonomous search light system 4.

From the determined three-dimensional position of the RF transmitter 10, the controller 14 (see FIG. 3A) calculates the orientation of the light output 6 as desired for directing the light output 6 towards the RF transmitter 10 (step 400). In doing so, the controller 14 may take into account a potential offset between the position of the RF transmitter 10 and the target 8 which is to be illuminated. As illustrated in FIG. 2, the target 8, for example, may be located in some distance d below the RF transmitter 10, when the target 8 is attached to a hook 22 at the free end of the movable winch portion 21 of the winch system 20.

Additional parameters of the light output 6, such as an intensity and/or a focus of the light output 6, may be adjusted based on the determined position of the RF transmitter 10 as well.

In the following step 402, the adjustable light output 6, emitted by the search light 12, is adjusted according to the calculated parameters. As a result, the adjustable light output 6 is autonomously directed towards the target 8, resulting in an optimized illumination of the target 8.

If a manual control input is entered via a manual input device 25 (step 100), the autonomous control of the search light 12 is canceled in step 404, in order to allow for manual controlling of the search light 12 in step 406.

In a third operation mode 300, the RF receiver 16 and the RF antennas 18a, 18b, 18c are configured in step 302 for receiving (in step 304) RF signals in a second frequency band, in particular in a second frequency band including frequencies in the range of between 200 MHz and 500 MHz, more particularly frequencies in the range of between 350 MHz and 450 MHz. RF signals having frequencies in this range are usually emitted by RF transmitters 10 provided at commercially available life saving equipment devices 9, such as life vests and avalanche detection devices, in order to allow for locating said life saving equipment devices 9 in an emergency situation.

In a following step 306, the position of the RF transmitter 10 with respect to the autonomous search light system 4 is determined from the received RF signals.

As in the second operation mode 200, which has been described before, RF signals from at least three spatially separated RF antennas 18a, 18b, 18c may be used for determining the three-dimensional position of the RF transmitter 10.

However, in case one dimension of the position of the RF transmitter 10 is known, for example since it is known that the target 8 is located on a (water) surface below the aircraft 2, and the height of the aircraft 2 over said surface is known, RF signals received by at least two spatially separated RF antennas 18a, 18b, 18c may be sufficient for determining the three-dimensional position of the RF transmitter 10. This situation is similar to the previously described situation, in which the distance D between the target 8 and the stationary winch portion 24 of the winch system 20 is known and used as a third parameter for determining the position of the RF transmitter 10, based on RF signals received by two RF antennas 18a, 18b.

After the position of the RF transmitter 10 has been determined, the controller 14 continues with calculating the parameters of the adjustable light output 6 in step 400 and adjusting the light output 6 of the search light 12 in step 402, as it has been described before with respect to the second operation mode 200.

Similar to the second operation mode 200, the autonomous control of the search light 12 is canceled in step 404, in order to allow for manual control of the search light 12 in step 406, if a manual control input is entered via the manual input device 25.

While the invention has been described with reference to exemplary embodiments, it will be understood by those skilled in the art that various changes may be made and equivalence may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiments disclosed, but that the invention will include all embodiments falling within the scope of the appended claims.

The invention claimed is:

1. An autonomous search light system for being mounted to an aircraft, the autonomous search light system comprising:
 a search light for emitting an adjustable light output, wherein the search light is coupled to the aircraft;
 an RF receiver with at least three RF antennas for receiving RF signals emitted by an RF transmitter, wherein the RF transmitter is attached to a target that is to be illuminated with the adjustable light output of the search light, when spaced from the aircraft; and
 a controller for determining a position of the RF transmitter in relation to the search light from the received RF signals and for controlling the search light based on the determined position of the RF transmitter;
 wherein the RF receiver and the RF transmitter both are RF transceivers which allow for a bi-directional communication between the RF receiver and the RF transmitter; and
 wherein the RF transmitter is selectively operable in a transmitting mode and in a standby mode, wherein the RF transmitter emits RF signals when operated in the transmitting mode and wherein the RF transmitter does not emit RF signals when operated in the standby mode, wherein the RF transmitter is switchable from the standby mode into the transmitting mode by a wake-up signal emitted by the RF receiver and received by the RF transmitter.

2. The autonomous search light system according to claim 1, wherein the RF transmitter comprises an electric power source.

3. The autonomous search light system according to claim 2, wherein the power source is a rechargeable electric battery.

4. A winch system for being mounted to an aircraft, comprising:
 an autonomous search light system according to claim 1;
 a stationary winch portion configured to be attached to the aircraft; and
 a movable winch portion, which is movable with respect to the stationary winch portion, wherein the RF transmitter of the autonomous search light system is attached to the movable winch portion.

5. An aircraft, comprising:
 a winch system according to claim 4.

6. The autonomous search light system according to claim 1, wherein the controller is configured to control at least one of a light output direction, a light output intensity and a focus of the adjustable light output of the search light, or any combination thereof.

7. The autonomous search light system according to claim 1, wherein the RF receiver is configured for receiving RF signals in at least two different frequency ranges, wherein the at least two different frequency ranges include in particular a first frequency range including frequencies in the range of between 1 GHz and 10 GHz.

8. The autonomous search light system according to claim 1, wherein the RF antennas of the RF receiver are spaced apart from each other, wherein the RF antennas of the RF receiver are in particular spaced apart from each other in a distance of at least 5 cm.

9. The autonomous search light system according to claim 1, further comprising the RF transmitter for emitting RF signals to be received by the RF receiver, wherein the RF transmitter is in particular configured for emitting RF signals in the range of between 1 GHz and 10 GHz.

10. An aircraft, comprising:
an autonomous search light system according to claim 1.

11. The autonomous search light system according to claim 1, wherein the RF transmitter is configured for switching back into the standby mode, when it does not receive the a wake-up signal for more than a predetermined amount of time.

12. The autonomous search light system according to claim 1, wherein the RF transmitter is configured for switching back into the standby mode upon receiving a shutdown signal from the RF receiver.

13. A winch system for being mounted to an aircraft, comprising:
a stationary winch portion configured to be attached to the aircraft; and
a movable winch portion, which is movable with respect to the stationary winch portion;
a rotatable member, which is rotatable with respect to the stationary winch portion, wherein the movable winch portion is movable with respect to the stationary winch portion by rotating the rotatable member;
a detector for detecting a rotational position of the rotatable member;
an autonomous search light system comprising:
 a search light for emitting an adjustable light output, wherein the search light is coupled to the aircraft;
 an RF receiver with at least two RF antennas for receiving RF signals emitted by an RF transmitter, wherein the RF transmitter is attached to a target that is to be illuminated with the adjustable light output of the search light, when spaced from the aircraft; and
 a controller for determining a position of the RF transmitter, which is attached to the movable winch portion, in relation to the search light from the received RF signals and from the rotational position of the rotatable member detected by the detector; and for controlling the search light based on the determined position of the RF transmitter;
wherein the RF receiver and the RF transmitter both are RF transceivers which allow for a bi-directional communication between the RF receiver and the RF transmitter; and
wherein the RF transmitter is selectively operable in a transmitting mode and in a standby mode, wherein the RF transmitter emits RF signals when operated in the transmitting mode and wherein the RF transmitter does not emit RF signals when operated in the standby mode, wherein the RF transmitter is switchable from the standby mode into the transmitting mode by a wake-up signal emitted by the RF receiver and received by the RF transmitter.

14. The winch system according to claim 13, wherein the controller is configured to control at least one of a light output direction, a light output intensity and a focus of the adjustable light output of the search light, or any combination thereof.

15. The winch system according to claim 13, wherein the RF receiver is configured for receiving RF signals in at least two different frequency ranges, wherein the at least two different frequency ranges include in particular a first frequency range including frequencies in the range of between 1 GHz and 10 GHz.

16. The winch system according to claim 13, wherein the RF antennas of the RF receiver are spaced apart from each other, wherein the RF antennas of the RF receiver are in particular spaced apart from each other in a distance of at least 5 cm.

17. The winch system according to claim 13, further comprising the RF transmitter for emitting RF signals to be received by the RF receiver, wherein the RF transmitter is in particular configured for emitting RF signals in the range of between 1 GHz and 10 GHz.

18. The winch system according to claim 13, wherein the RF transmitter comprises an electric power source, wherein the power source is in particular a rechargeable electric battery.

19. The winch system according to claim 13, wherein the RF receiver comprises exactly two RF antennas for receiving RF signals emitted by the RF transmitter.

20. An aircraft, comprising:
a winch system according to claim 13.

21. A method of operating an autonomous search light system mounted to an aircraft, the autonomous search light system comprising a search light for emitting an adjustable light output, the search light being coupled to the aircraft, and an RF receiver with at least three RF antennas for receiving RF signals emitted by an RF transmitter, wherein the RF transmitter is attached to a target that is spaced from the aircraft and is to be illuminated with the adjustable light output of the search light; wherein the method includes:
receiving RF signals emitted by the RF transmitter;
determining a position of the RF transmitter in relation to the search light from the received RF signals; and
autonomously controlling the search light based on the determined position of the RF transmitter;
wherein autonomously controlling the search light includes at least one of:
 adjusting a light output direction of the adjustable light output;
 adjusting a light output intensity of the adjustable light output; and
 adjusting a focus of the adjustable light output;
wherein the RF transmitter is selectively operated in a transmitting mode and in a standby mode, wherein the RF transmitter emits RF signals when operated in the transmitting mode and wherein the RF transmitter does not emit RF signals when operated in the standby mode, and
wherein the RF transmitter is switched from the standby mode into the transmitting mode by a wake-up signal emitted by the RF receiver and received by the RF transmitter.

22. The autonomous search light system according to claim 1, wherein the RF receiver comprises exactly three RF antennas for receiving RF signals emitted by the RF transmitter.

23. The method according to claim 21, wherein the method further includes switching the RF transmitter back into the standby mode, when it does not receive the wake-up signal for more than a predetermined amount of time.

24. The method according to claim 21, wherein the method further includes switching the RF transmitter back into the standby mode upon receiving a shutdown signal from the RF receiver.

* * * * *